United States Patent
Lundberg et al.

(10) Patent No.: US 7,214,172 B2
(45) Date of Patent: May 8, 2007

(54) SEAL AT PRESS ROLLERS

(75) Inventors: Jörgen Lundberg, Östersund (SE); Torbjörn Henriksson, Sundsvall (SE)

(73) Assignee: Metso Paper, Inc. (FI)

( * ) Notice: Subject to any disclaimer, the term of this patent is extended or adjusted under 35 U.S.C. 154(b) by 260 days.

(21) Appl. No.: 10/487,119

(22) PCT Filed: Aug. 19, 2002

(86) PCT No.: PCT/SE02/01472

§ 371 (c)(1),
(2), (4) Date: Feb. 19, 2004

(87) PCT Pub. No.: WO03/018907

PCT Pub. Date: Mar. 6, 2003

(65) Prior Publication Data
US 2005/0012276 A1    Jan. 20, 2005

(30) Foreign Application Priority Data
Aug. 23, 2001  (SE) .................................. 0102811

(51) Int. Cl.
*B25F 5/02* (2006.01)
*B21D 53/00* (2006.01)

(52) U.S. Cl. ........................ 492/47; 492/42; 29/895.22
(58) Field of Classification Search .................. 492/47, 492/42
See application file for complete search history.

(56) References Cited

U.S. PATENT DOCUMENTS 4,944,089 A * 7/1990 Flamig et al. ............ 29/895.22
5,265,447 A   11/1993 Bilodeau et al.

FOREIGN PATENT DOCUMENTS

| EP | 0 026 661 A2 | 4/1981 |
|---|---|---|
| SE | 503 010 C2 | 3/1996 |
| SE | 509 519 C2 | 2/1999 |

* cited by examiner

*Primary Examiner*—Marc Jimenez
(74) *Attorney, Agent, or Firm*—Lerner, David, Littenberg, Krumholz & Mentlik, LLP

(57) ABSTRACT

Apparatus for sealing a cylindrical roll with respect to a trough in which the roll is disposed is disclosed, the apparatus comprising an end seal applied to the end surface of the cylindrical roll, a longitudinally extending seal applied to the barrel-shaped outer surface of the cylindrical roll, and a spring for dynamically urging the end seal against the end surface of the cylindrical roll and against the longitudinally extending seal.

8 Claims, 2 Drawing Sheets

SEAL AT PRESS ROLLERS

FIELD OF INVENTION

The present invention relates to the de-watering material suspensions with the aid of press rolls, and more particularly to a sealing arrangement located between a press roll and a trough or pit that partially surrounds the roll.

BACKGROUND OF THE INVENTION

As will be apparent from Swedish Patent Nos. 503,010 and 509,519, such press rolls are at present sealed by means of an end seal that connects with the end surface of the roll, wherein a longitudinally extending seal in the form of a flexible element is pressed against the cylindrical surface of the roll.

It is generally difficult to seal around a corner of a rotating press roll, because the roll is moveable in two directions. Firstly, the roll moves axially as a result of thermal expansion, and secondly it moves radially as a result of variation in the clearance between rolls. Sealing against the roll end is achieved with the end seal and with the seal that extends longitudinally along the roll, both of these seals being pressurised and "floating" with the roll in a direction that is normal to the sealing surface. Sealing around the corner of a roll is effected with the aid of a static seal that seals against the longitudinally extending seal on the one hand and against the end seal on the other hand.

The static seal tends not to follow the sealing surface, and is therefore mounted with a given clearance in relation thereto. This clearance can result in leakage if excessively large and in wear of the sealing surface if excessively small.

One object of the present invention is to provide a seal at an edge of a moveable roll that will solve the aforesaid problems, and then in particular with regard to a roll of a roll press for de-watering material suspensions.

SUMMARY OF THE INVENTION

In accordance with the present invention, this and other objects have now been realized by the invention of apparatus for sealing a cylindrical roll with respect to a trough in which the cylindrical roll is partially disposed, the cylindrical roll including an end surface and a barrel-shaped outer surface, the apparatus comprising an end seal applied to the end surface of the cylindrical roll, a longitudinally extending seal applied to the barrel-shaped outer surface of the cylindrical roll, and urging means for dynamically urging the end seal against the end surface of the cylindrical roll and against the longitudinally extending seal. Preferably, the cylindrical roll comprises a press roll for dewatering material suspensions.

In accordance with one embodiment of the apparatus of the present invention, the urging means comprises a spring. Preferably, the spring comprises a leaf spring, and the end seal includes an oblique surface, the leaf spring being applied against the oblique surface, whereby a predetermined force distribution is obtained between the end surface of the cylindrical roll and the longitudinally extending seal. In another embodiment, the spring exerts a predetermined spring force, and 60% of the predetermined spring force is exerted against the end surface of the cylindrical roll and 40% of the predetermined spring force is exerted against the longitudinally extending seal.

In accordance with another embodiment of the apparatus of the present invention, the apparatus includes a guide plate for the end seal and a seat for the end seal, whereby the end seal can move only in a single plane thereby. Preferably, both the end seal and the longitudinally extending seal are adapted solely for movement in the single plane. In a preferred embodiment, the end seal includes a wedge-like surface and the longitudinally extending seal includes a corresponding wedge-like surface adapted for coacting with the wedge-like surface of the end seal, thereby forming a lip on the longitudinally extending seal facing outwardly from the trough.

In accordance with another embodiment of the apparatus of the present invention, the apparatus includes a piston-cylinder mechanism for applying the longitudinally extending seal to the periphery of the cylindrical roll.

The present invention includes a dynamically spring biased edge seal that follows the sealing surface in two directions and which seals against both the end seal and the longitudinally extending seal.

The edge seal includes an oblique surface against which a spring acts, wherein the slope of that surface can be chosen for appropriate force distribution of one force component acting on the sealing surface and the other force component acting on the longitudinal seal. For example, the spring may be caused to exert up to about 60% of its force on the sealing surface and up to about 40% of its force on the longitudinal seal.

The edge seal is preferably adapted to lie flat against the end surface of the end seal and includes a wedge-shaped surface that co-acts with a corresponding wedge-shaped surface on the longitudinal seal.

BRIEF DESCRIPTION OF THE DRAWINGS

The present invention will now be described in more detail with reference to the following detailed description, which in turn refers to the accompanying drawings, in which.

DETAILED DESCRIPTION

Figure 1:
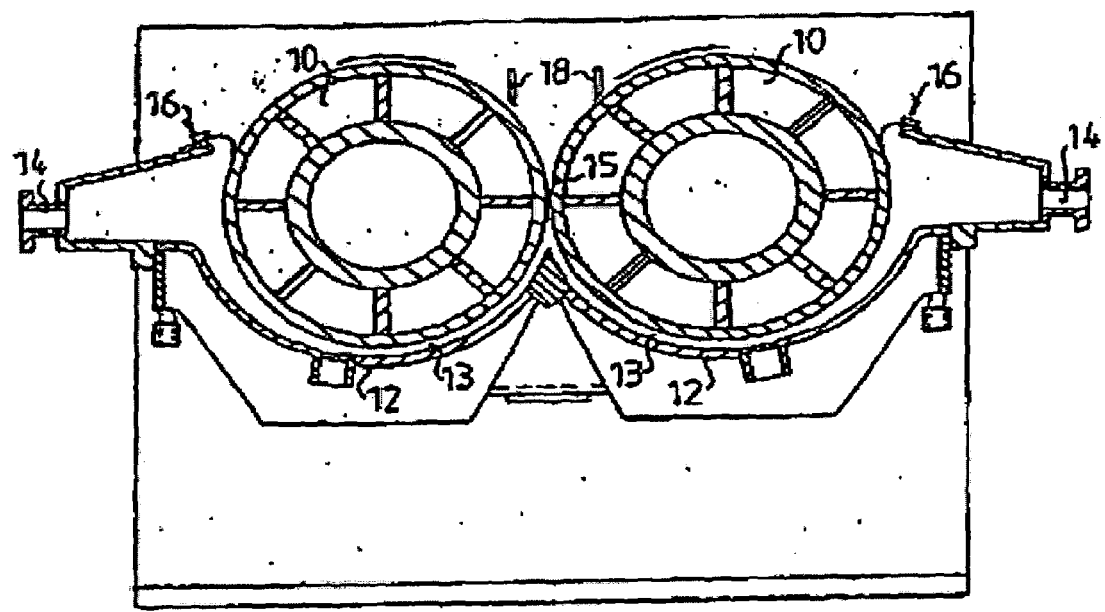
FIG. 1 is a side, elevational, partial, cross-sectional view of a conventional roll press.

The conventional roll press illustrated in FIG. 1 includes two cylindrical rotatable, liquid permeable press rolls 10 whose barrel shaped surfaces are comprised of perforated sheet metal welded to a roll body. The rolls are received partially in a trough 12 such as to form spaces 13 between the rolls and the inner surface of the pit. These spaces 13 communicate with pulp suspension inlets 14. The press rolls 10 form therebetween a press nip 15. The spaces 13 are sealed from the surroundings by means of seals 16 acting against the barrel surfaces of the rolls 10 and end seals which act against the end walls of the rolls. The pulp web present in the roll nip 15 functions as a seal between the rolls. Doctor arrangements 18 are positioned downstream of the nip for removing from the barrel surfaces of the rolls the pulp web accompanying the rolls from the roll nip 15. The seal 16 between the trough 12 and the barrel surface of each roll 10 extends along the full length of the roll.

Figure 2:
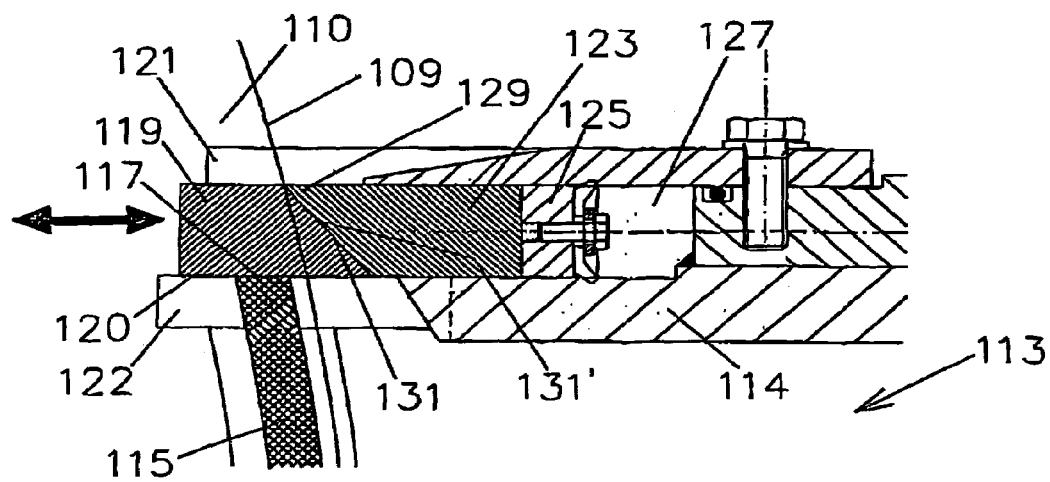
FIG. 2 is a side, elevational, partial sectional view of an inventive seal in accordance with the present invention.

FIG. 2 is a sectional view of the inventive sealing arrangement, where the barrel surface 109 of a press roll 110 to be sealed is shown schematically with a peripheral line. The space 113 to be sealed comprises the internal volume of a trough 114 similar to that shown in FIG. 1. The sealing arrangement includes an end seal 115 which is placed in sealing abutment with the end wall of the roll. The end seal 115 is terminated with a flat end surface 117 with which a flat side 120 of an edge seal 119 abuts.

The edge seal 119 is adapted to move in a plane at right angles to the end wall of the roll and parallel with the end surface 117, as shown by the double-headed arrow in that Figure. Movement of the edge seal to this plane is controlled positively (forcibly guided) by virtue of the movement that takes place between a guide plate 121 and a seating 122. Sealing of the space 113 against the roll periphery is effected with the aid of a longitudinally extending seal 123 which is mounted in the trough 114 for movement into contact with the barrel surface 109 in the same plane as that in which edge seal 119 moves. The longitudinally extending seal 123 is adapted to be pressed against the barrel surface with the aid of a piston-cylinder device 125 which exerts pressure against the seal when a pressure medium is pressurised in a limited volume 127 in which the piston is intended to move. That part of the longitudinally extending seal 123 which faces towards the barrel surface includes a lip 129 which is formed by a longitudinally extending wedge-like surface 131 on the seal. The oblique surface of the seal 123 abuts with a corresponding wedge-like surface 131' on the edge seal 119.

Figure 3:
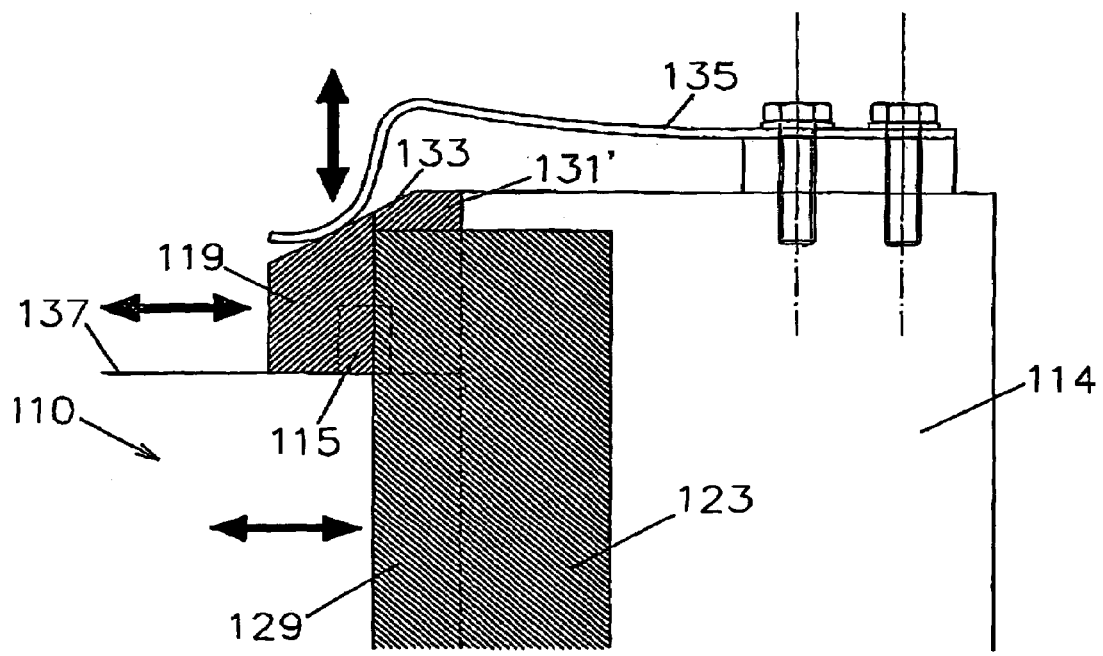
FIG. 3 is a top, elevational, cross-sectional view of the seal according to the present invention.

FIG. 3 is a schematic view from above of the edge seal 119, the longitudinally extending seal 123 and the end seal 115, indicated in broken lines beneath the edge seal 119, and shows that these sealing devices mutually co-act through the medium of the possible directions of movements shown by the double headed arrows in the Figure. In this regard, the edge seal 119 is provided with an oblique surface 133 against which a leaf spring 135 acts dynamically. The leaf spring is mounted on the outside of the trough 114, so that the spring can be adjusted into optimal abutment with and optimal tension against the edge seal and so that it can follow dynamically the longitudinal movements of the roll and the movements of the longitudinally extending seal. As a result of the spring force acting on the oblique surface, the edge seal is pressed against the end wall 137 of the roll 110 and also against the longitudinally extending seal 123, as indicated by the two upper double-headed arrows in the figure. The longitudinally extending seal 123, with its lip 129, is moveable towards and away from the roll 110 respectively, as indicated by the lowermost double-headed arrow in that figure. As will be seen from the figure, the longitudinally extending seal 123 extends along the full length of the roll 110 and slightly beyond the roll, so as to overlap the edge seal 119 and co-act with its wedge-like surface 131'.

This has been described above with reference to FIGS. 2 and 3 a sealing arrangement at one corner of a roll press. It will be understood, however, that in reality a roll press according to FIG. 1 will require a sealing arrangement at all four corners of the press.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. Apparatus for sealing a cylindrical roll with respect to a trough in which said cylindrical roll is partially disposed, said cylindrical roll including an end surface and a barrel shaped outer surface, said apparatus comprising an end seal applied to said end surface of said cylindrical roll, a longitudinally extending seal applied to said barrel shaped outer surface of said cylindrical roll, and urging means for dynamically urging an edge seal against said end surface of said cylindrical roll and against said longitudinally extending seal; wherein said urging means comprises a spring.

2. The apparatus of claim 1 wherein said cylindrical roll comprises a press roll for dewatering material suspensions.

3. The apparatus of claim 1 wherein said spring comprises a leaf spring, and wherein said edge seal includes an oblique surface, said leaf spring being applied against said oblique surface, whereby a predetermined force distribution is obtained between said end surface of said cylindrical roll and said longitudinally extending seal.

4. The apparatus of claim 1 wherein said spring exerts a predetermined spring force, and wherein 60% of said predetermined spring force is exerted against said end surface of said cylindrical roll and 40% of said predetermined spring force is exerted against said longitudinally extending seal.

5. The apparatus of claim 1 including a guide plate for said edge seal and a seat for said edge seal, whereby said edge seal can move only in a single plane thereby.

6. The apparatus of claim 5 wherein both said edge seal and said longitudinally extending seal are adapted solely for movement in said single plane.

7. The apparatus of claim 6 wherein said edge seal includes a wedge-like surface and said longitudinally extending seal includes a corresponding wedge-like surface adapted for co-acting with said wedge-like surface of said edge seal, thereby forming a lip on said longitudinally extending seal facing outwardly from said trough.

8. The apparatus of claim 1 including a piston-cylinder mechanism for applying said longitudinally extending seal to said periphery of said cylindrical roll.

\* \* \* \* \*

UNITED STATES PATENT AND TRADEMARK OFFICE
CERTIFICATE OF CORRECTION

| | | |
|---|---|---|
| PATENT NO. | : 7,214,172 B2 | Page 1 of 1 |
| APPLICATION NO. | : 10/487119 | |
| DATED | : May 8, 2007 | |
| INVENTOR(S) | : Göran Lundberg and Torbjörn Henriksson | |

It is certified that error appears in the above-identified patent and that said Letters Patent is hereby corrected as shown below:

On the Title Page, item (86), please correct the date "Feb. 19, 2004" to read --Aug. 12, 2004--.

Signed and Sealed this

Seventh Day of August, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,214,172 B2 | Page 1 of 1 |
| APPLICATION NO. | : 10/487119 | |
| DATED | : May 8, 2007 | |
| INVENTOR(S) | : Jörgen Lundberg and Torbjörn Henriksson | |

It is certified that error appears in the above-identified patent and that said Letters Patent is hereby corrected as shown below:

On the Title Page, Item (75), please correct the 1st inventor's first name "Göran" to read --Jörgen--.

Signed and Sealed this

Fifth Day of February, 2008

JON W. DUDAS
*Director of the United States Patent and Trademark Office*